(12) United States Patent
Hayami

(10) Patent No.: US 6,761,473 B2
(45) Date of Patent: Jul. 13, 2004

(54) VEHICLE LIGHTING APPARATUS

(75) Inventor: Toshihisa Hayami, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/136,996

(22) Filed: May 1, 2002

(65) Prior Publication Data

US 2002/0163815 A1 Nov. 7, 2002

(30) Foreign Application Priority Data

May 7, 2001 (JP) .................................. P2001-135897

(51) Int. Cl.[7] .......................... B60Q 1/06; B60Q 1/08; B60Q 1/10; F21V 1/00
(52) U.S. Cl. ...................... 362/466; 362/526; 362/467
(58) Field of Search ................................ 362/456, 465, 362/523, 526, 467, 466

(56) References Cited

U.S. PATENT DOCUMENTS

| | | | |
|---|---|---|---|
| 4,663,696 A | 5/1987 | Miyazawa et al. | ............ 362/80 |
| 5,410,456 A | 4/1995 | Shibata et al. | ................ 362/40 |
| 6,302,553 B1 * | 10/2001 | Izawa | .......................... 362/37 |
| 6,305,823 B1 * | 10/2001 | Toda et al. | ................. 362/276 |

FOREIGN PATENT DOCUMENTS

| | | |
|---|---|---|
| DE | 19722717 A | 12/1997 |
| JP | 2000-118293 | 4/2000 |

OTHER PUBLICATIONS

Search Report for Application No. GB 0209978.6.

* cited by examiner

Primary Examiner—Sandra O'Shea
Assistant Examiner—Sharon Payne
(74) Attorney, Agent, or Firm—Fish & Richardson P.C.

(57) ABSTRACT

A vehicle lighting apparatus includes lamp deflection angle controlling means for controlling the change of a deflection angle of a lamp. The vehicle lighting apparatus further includes a reference angular position setting means for setting the deflection angle of the lamp to a predetermined reference angular position when a deflection angle detecting means for detecting the deflection angle of the lamp is broken down. When the deflection angle of the lamp cannot be detected in an adaptive front-lighting system (AFS), and thus the AFS lapsed into malfunction, the deflection angle of the lamp is fixed to a reference position obtained by rotating a motor for deflecting the lamp in one direction to the locked state, and from this locked state, rotating by the given amount in the reverse direction.

8 Claims, 10 Drawing Sheets

VEHICLE LIGHTING APPARATUS

BACKGROUND OF THE INVENTION

1. Field of the Invention

The present invention relates to a lighting apparatus for vehicles such as motor vehicles, and more specifically, to a vehicle lighting apparatus comprising lamp deflection angle controlling means for controlling the changes in direction of beam of the lamp corresponding to the traveling conditions, for example, an adaptive front-lighting system (hereinafter referred to as AFS) for ensuring driving safety against a disorder occurred in the AFS.

2. Description of the Related Art

The AFS proposed for enhancing driving safety of motor vehicles detects information on the steering angle of the steering wheel SW of the motor vehicles, the vehicle speed, and other traveling conditions of the motor vehicles by the sensor 1, and outputs the detected output to the electronic control unit 2 (hereinafter referred to as ECU) as shown in FIG. 1. The ECU 2 controls the swivel type lights 3R, 3L provided respectively on the left and right of the front portion of the motor vehicle, that is, the headlamps 3 that the direction of radiation can be deflected in the lateral direction based on the supplied sensor outputs. Such swivel type lights 3R, 3L may include, as a structure that can turn the reflector provided in the headlamp in the horizontal direction, a structure that can turn the reflector by the driving source such as a motor or the like, which is referred to as an actuator in this specification. According to the AFS in this type, when the motor vehicle travels on the curved road, the portion of the road ahead of the curve may be illuminated corresponding to the traveling speed of the motor vehicle, thereby effective in improving driving safety.

However, when a failure occurred in the AFS, especially when it became uncontrollable in a state in which the direction of radiation of the headlamp is deflected either to the left or the right with respect to the straight ahead direction of the motor vehicle, the forward of the motor vehicle cannot be illuminated when motor vehicle is driving straight ahead or turning along the curve in the opposite direction and thus deteriorate driving safety. Failures in the AFS includes, in the AFS shown in FIG. 1 for example, a case where the sensor 1 is broken down and thus the sensor outputs is not supplied from the sensor 1 to the ECU2, a case where the ECU 2 is broken down, and a case where the actuator in the headlamp 3 is broken down, and in any cases, the AFS cannot function normally. Therefore, the AFS is required to have a capability that prevents deteriorating of safety even when a failure occurred, that is, failsafe capability.

SUMMARY OF THE INVENTION

The object of the present invention is to provide a vehicle lighting apparatus having failsafe capability ensuring driving safety even when a disorder occurred in the AFS.

The present invention is a vehicle lighting apparatus including lamp deflection angle controlling means for controlling the changes in deflection angle of the direction of radiation of the lamp corresponding to the traveling conditions of the vehicle, wherein the lamp deflection angle controlling means comprises abnormality detecting means for detecting abnormality of the deflection angle detecting means for detecting the deflection angle of the lamp, and a reference angular position setting means for setting the deflection angle of the lamp to the predetermined reference angular position when abnormality occurred in the deflection angle detecting means. The reference angular position setting means comprises a motor for changing the deflection angle of the lamp, rotational position detecting means for detecting the rotational position of the motor, and motor controlling means for driving and controlling the motor, and the motor controlling means is adapted to be capable of controlling the motor to rotate in one direction to the locked state when abnormality occurred in the lamp deflecting angle detecting means and of controlling the motor to rotate in the reverse direction by a prescribed rotational angle after the motor is brought into the locked state. The motor of the reference angular position setting means includes a hall element for supplying pulse signal in accordance with the rotational operation of the motor, and the controlling means is preferably adapted to perform control to count the number of pulses of the pulse signal supplied from the hall element as control to rotate the motor means in the reverse direction by a prescribed rotational angle. Further, the lamp deflection angle controlling means may comprise a sensor for detecting the steering direction of the vehicle, a control unit for supplying the lamp defection angle signal based on the sensor outputs, and an actuator for deflecting the lamp based on the lamp deflection angle signal, wherein the abnormality detecting means are provided in the control unit and the actuator respectively, so that the reference angular position setting means is actuated without the control unit along the path when abnormality is detected by the abnormality detecting means in the latter.

According to the present invention, when the deflection angle of the lamp in the AFS cannot be detected and thus the system lapsed into malfunction, the reference angular position setting means is actuated to fix the deflection angle of the lamp to the reference position so that the condition in which the lamp is fixed to the abnormal deflection angle with respect to the traveling direction of the vehicle can be prevented before happens, and thus failsafe that is favorable in terms of traffic safety may be realized. As reference angular position setting means, such a construction that the motor for deflecting the lamp is rotated in one direction to the locked state, and from this locked state, the motor that is rotated by a given amount is rotated by the given amount in the reverse direction may be employed, and by utilizing pulse signal supplied from the hall element attached on the motor in this case, additional components aside from the existing motor is not necessary, thereby preventing increase in complexity of construction and in the cost.

DETAILED DESCRIPTION OF THE PREFERRED EMBODIMENTS

Figure 1:
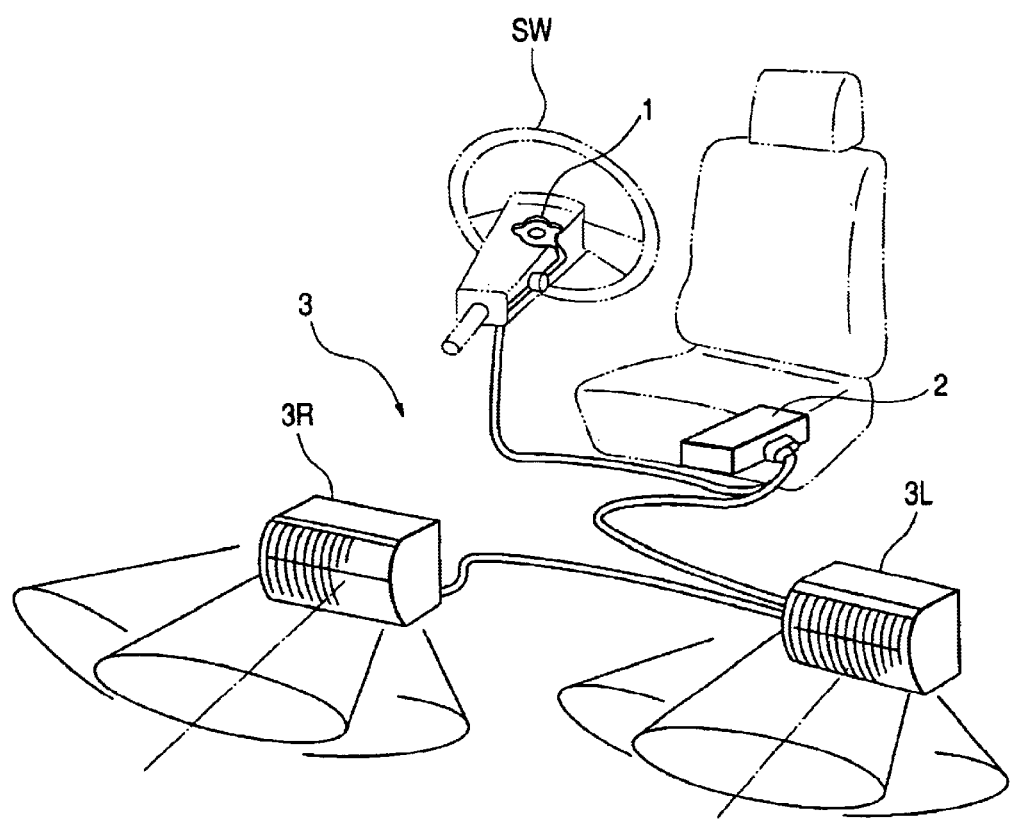
FIG. 1 is a drawing showing the conceptual construction of the AFS.
Figure 2:
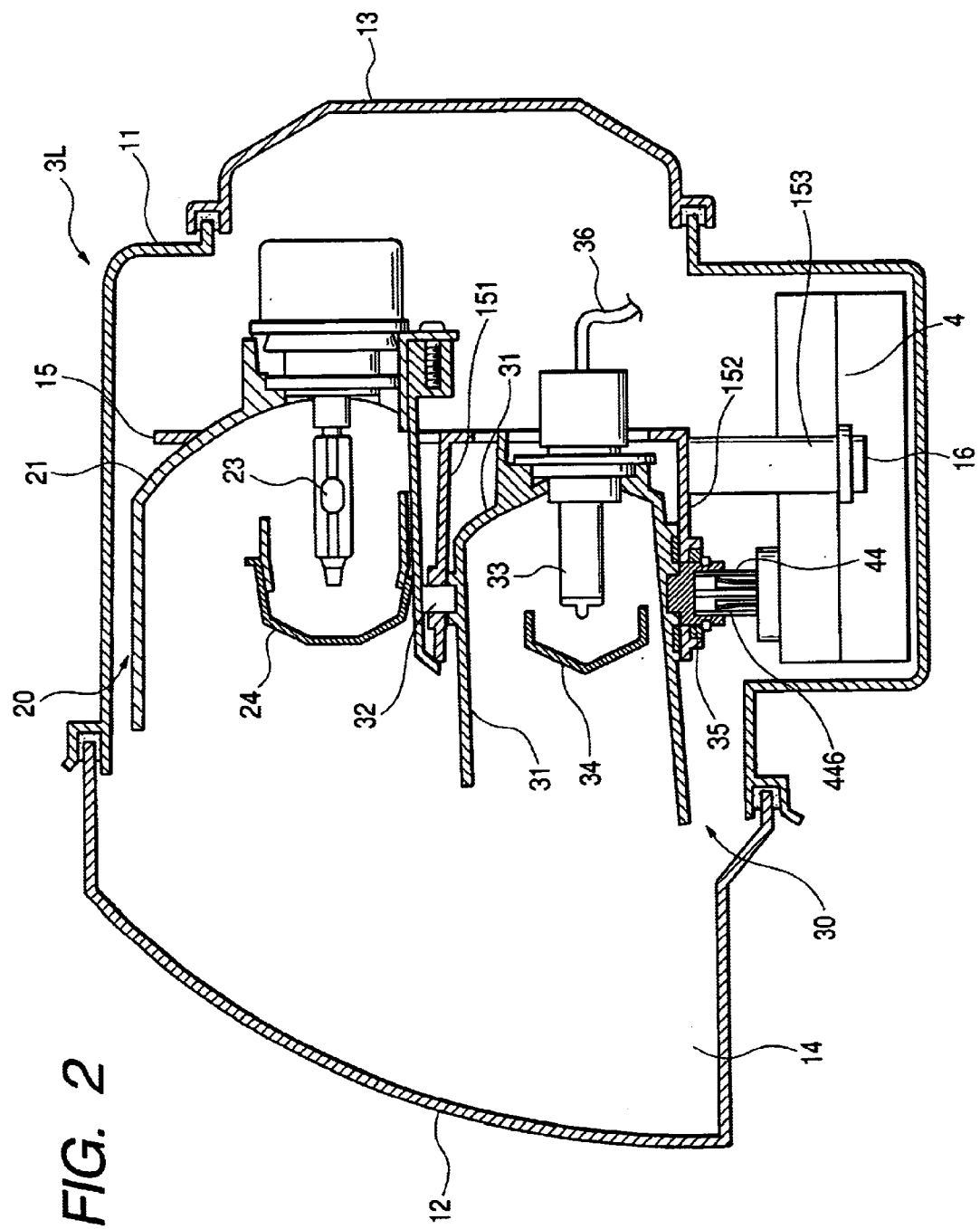
FIG. 2 is a vertical cross section of the swivel lamp.
Figure 3:
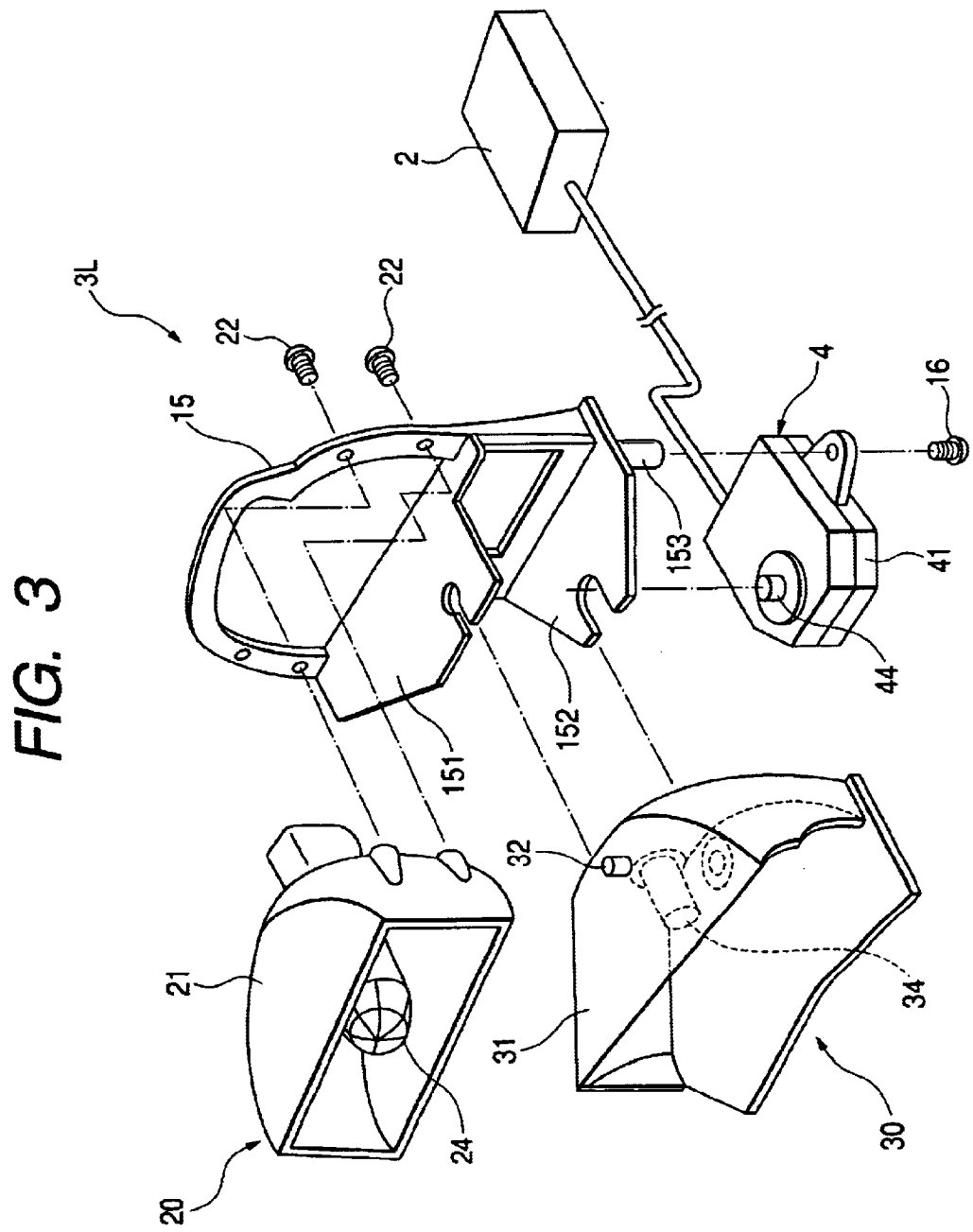
FIG. 3 is an exploded perspective view of the internal construction of the swivel lamp.

Referring now to the drawings, an embodiment of the present invention will be described. FIG. 2 is a vertical cross section of the left lamp 3L of the headlamps constructed of swivel type lights of which the direction of radiation is deflectable toward the left and the right out of the components of the AFS as lamp deflection angle controlling means according to the present invention shown in FIG. 1, FIG. 3 is a partially exploded perspective view of the internal construction thereof. The lamp body 11 is provided with a lens 12 at the front opening thereof and a cover 13 at the rear opening thereof to define a lamp chamber 14, and the lamp chamber 14 is provided with a fixed bracket 15 in the shape of a shelf having an upper plate 151 and the lower plate 152 therein. The fixed bracket 15 is provided with a fixed reflector 21 mounted at the upper portion thereof, and a swivel reflector 31 supported at the lower portion thereof. The fixed reflector 21 is fixed on the upper plate 151 of the fixed bracket 15 by means of a screw 22, and a discharge bulb 23 is mounted in the fixed reflector 21 together with a shade 24, so as to be constructed as a fixed lamp 20 having a prescribed luminous intensity distribution characteristic toward the front of the motor vehicle. The swivel reflector 31 is interposed between the upper plate 151 and the lower plate 152 of the fixed bracket 15, and fitted and supported so as to be capable of rotating in the horizontal direction about a supporting shaft 32 projected from the upper surface of the swivel reflector 31, and is provided therein with a halogen bulb 33 mounted together with a shade 34. An actuator 4 as lamp deflecting means driven by the ECU 2 as a lamp deflection angle control means shown in FIG. 1 is fixed and supported on the lower side of the lower plate 152 of the fixed bracket 15 in the lamp chamber 14, and a stem 153 provided on the fixed bracket 15 is fixed on a part of the actuator 4 by means of a screw 16. The revolving output shaft 44 of the actuator 4 is connected to the bearing portion 35 provided on the lower surface of the swivel reflector 31 at the coaxial position with the supporting shaft 32, so that the swivel reflector 31 is driven and rotated by a rotational driving force of the revolving output shaft 44, and constructs a swivel lamp 30 of which the direction of radiation can be deflected toward the left and the right.

Figure 4:
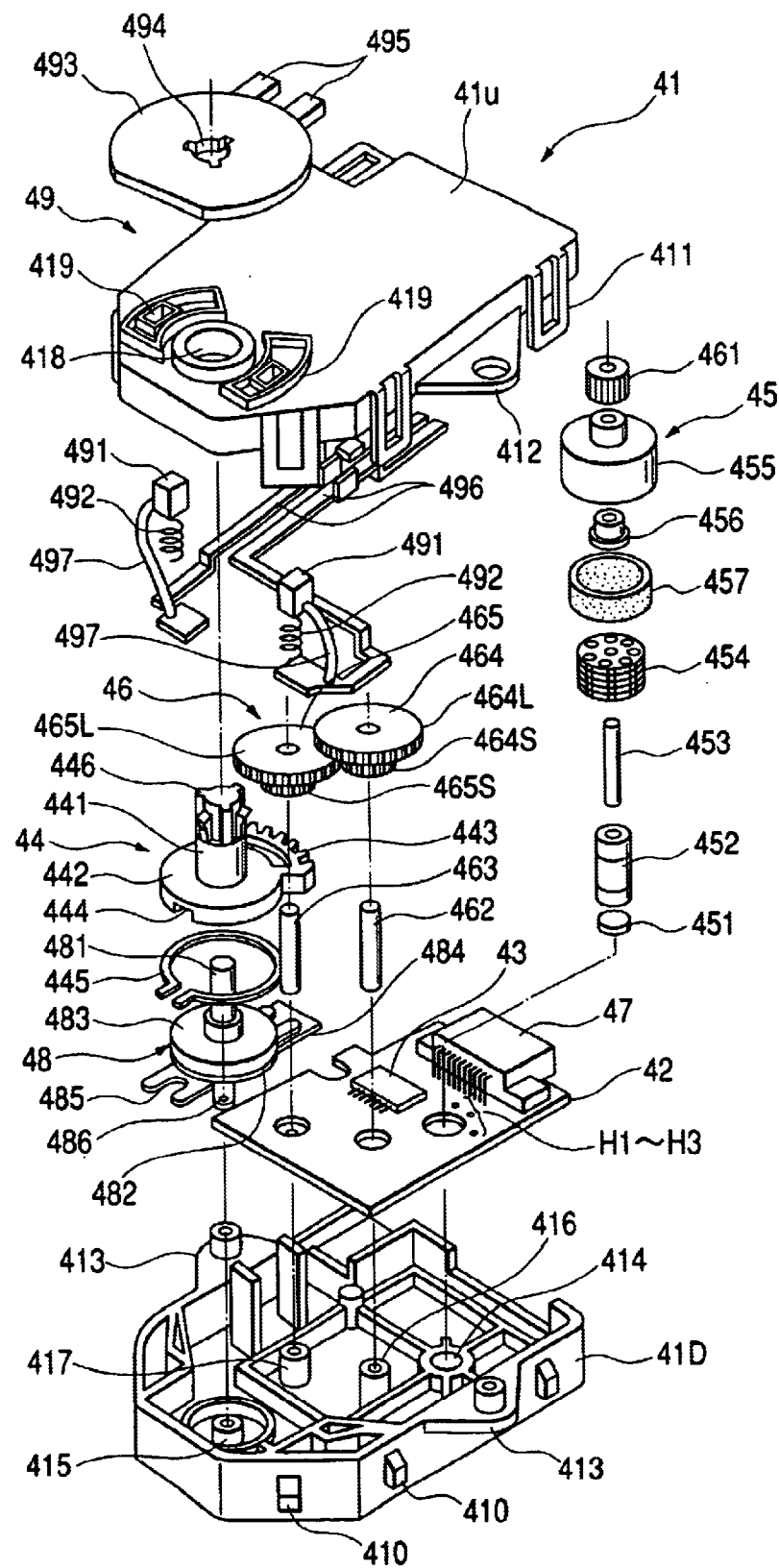
FIG. 4 is a partial exploded perspective view of the actuator.
Figure 5:
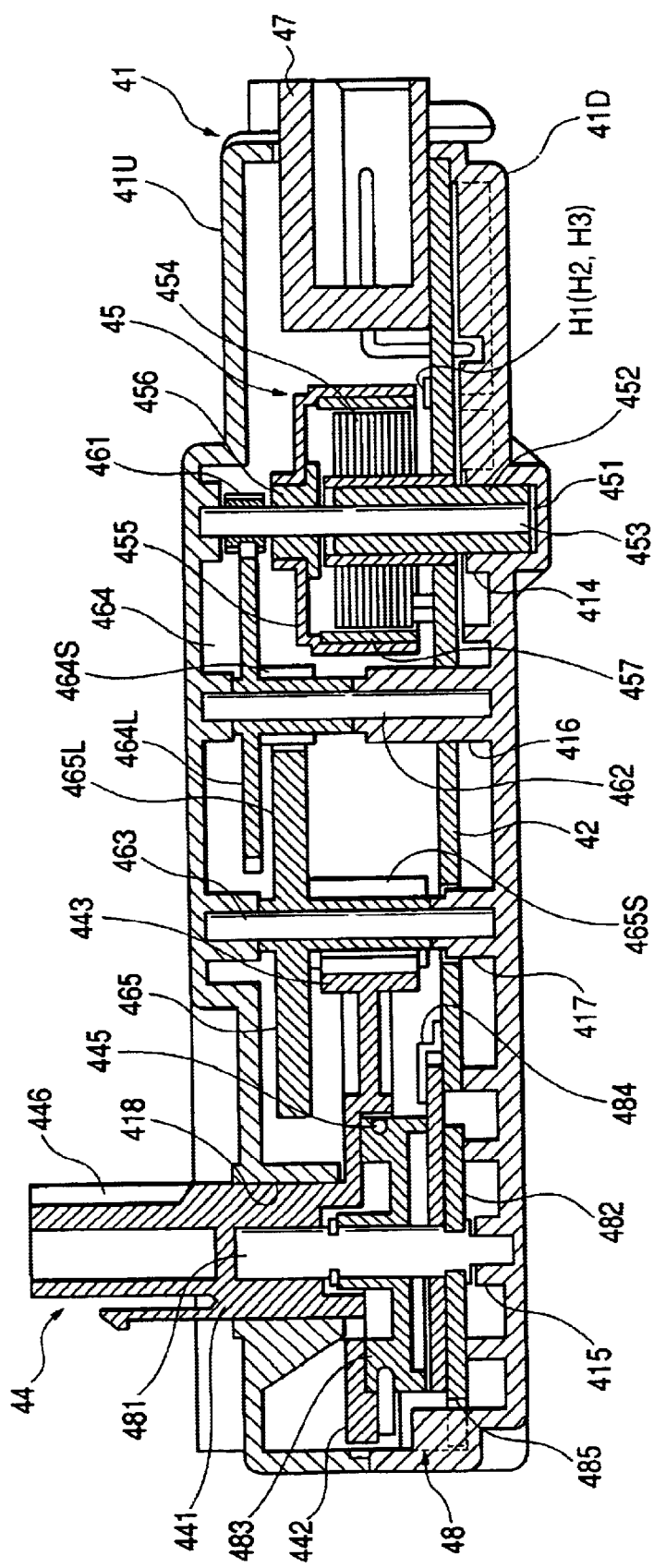
FIG. 5 is a vertical cross section of the actuator.

FIG. 4 is an exploded perspective view of the principal portion of the actuator 4, and FIG. 5 is a vertical cross section in its assembled state. The case 41 comprises a lower half 41D and the upper half 41U, and the projection 410 on the lower half 41D and the fitting strip 411 of the upper half 41U are fitted with respect each other. The upper half 41U and the lower half 41D are formed with the supporting strips 412, 413 projecting therefrom for supporting the fixed bracket 15 toward both sides respectively. The case 41 contains a printed board 42 having an electronic part 43 as a control circuit that will be described later, the revolving output shaft 44 for directly rotating the swivel reflector 31, a brushless motor 45 as a driving source for rotating the revolving output shaft 44, and a speed reducing gear mechanism 46 for transmitting a rotational force of the brushless motor 45 to the revolving output shaft 44 mounted thereon. The revolving output shaft 44 is provided with a potentiometer 48 as lamp deflecting angle detecting means disposed coaxially therewith. The printed board 42 is provided with a connector 47 to which the vehicle-mounted power cable, not shown, is connected for supplying electric power to the brushless motor 45 and the halogen lamp 33 of the swivel lamp 30 respectively. The upper half 41U is provided with a movable contact mechanism 49 for electrically connecting the actuator 4 and the cable 36 of the halogen lamp 33 on the upper surface thereof.

Figure 6:
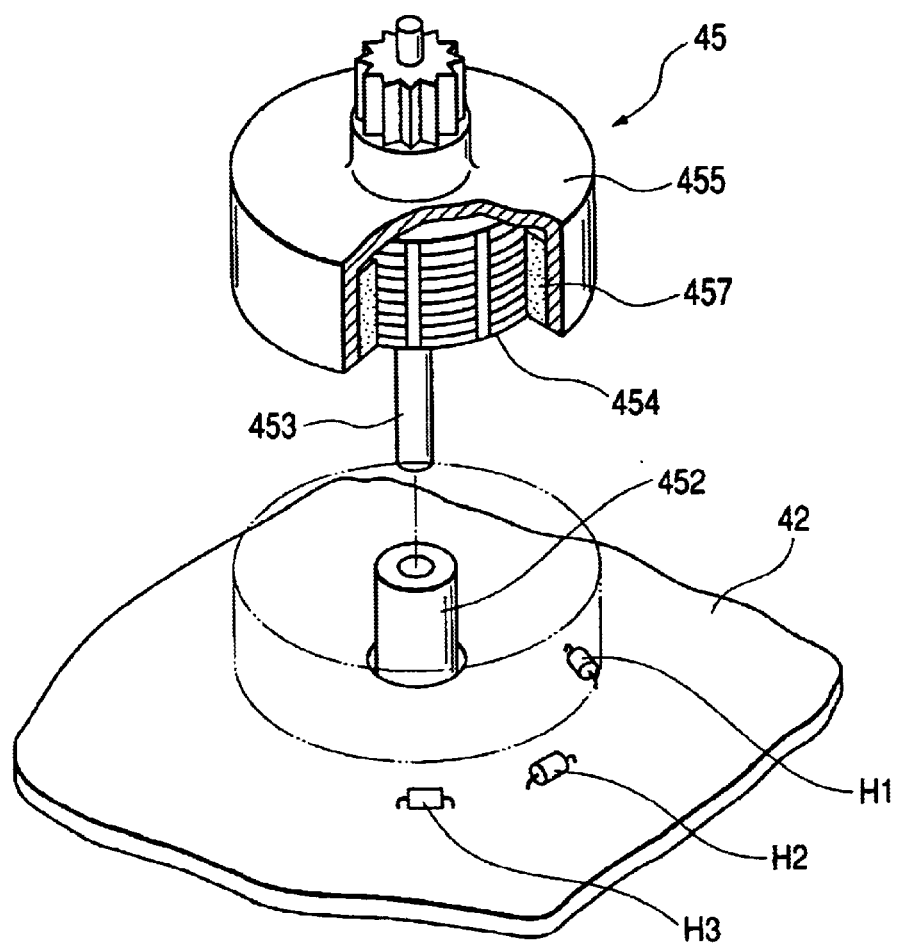
FIG. 6 is a partially enlarged perspective view of a brushless motor.

The brushless motor 45 comprises, as shown in FIG. 6 as a partially broken perspective view, a revolving shaft 453 supported in the boss hole 414 of the lower half 41D by means of a thrust bearing 451 and the bearing sleeve 452 so as to be capable of torsional rotation, a stator coil 454 fixed and supported on the printed board 42 around the revolving shaft 453, and a rotor 455 formed in the shape of a cylindrical container fixed to the revolving shaft 453 and mounted so as to cover the stator coil 454. The rotor 455 is fixed to the revolving shaft 453 by the rotor boss 456, and provided with a cylindrical rotor magnet 457 integrally on the inner surface thereof. The stator coil 454 comprises three pairs of coils equally distributed in the circumferential direction, and each pair of coils is fed with power via the printed wiring of the printed board 42, not shown, and magnetized into S-pole and N-pole alternately in the circumferential direction by such power feeding. The rotor magnet 457 is magnetized into S-pole and N-pole alternately in the circumferential direction corresponding to the stator coil 454. In the brushless motor 45, by supplying alternate current having different phases, that is, three phase current with respect to three coils of the stator coil 454, the rotor magnet 457, that is, the rotor 455 and the revolving shaft 453 are driven to rotate. In addition, as shown in FIG. 6, a plurality of, in this case, three hall elements H1, H2, H3 are disposed and supported on the printed board 42 at required intervals along the circumferential direction of the rotor 455, so that the magnetic field in each hall element H1, H2, H3 is changed when the rotor magnet 457 is rotated along with the rotor 455, and the state of each hall elements H1, H2, H3 is changed between ON and OFF to supply pulse signal corresponding to the cycle of rotation of the rotor 455.

The potentiometer 48 is provided with a fixed substrate 482 fixed on the fixed shaft 481 passing through the printed board 42 and standing upright in the boss hole 415 of the lower half 41D, and having a resistance pattern, not shown, formed on the surface thereof, and a rotary disc 483 rotatably supported on the fixed shaft 481 so as to face toward the fixed substrate 482 in the axial direction, and having a sliding contact point, not shown, for sliding on the surface of the resistance pattern. The fixed substrate 482 is prevented from rotating with respect to the lower half 41D by engaging the engaging projection 485 provided on a part of the circumference with a part of the inner wall of the lower half 41D. The rotary disc 483 is formed with an adjusting strip 486 projected from a part of the circumference thereof. This potentiometer 48 is constructed in such a manner that a rotary motion of the rotary disc 483 varies the sliding position of the sliding contact point on the surface of the resistance pattern, which in turn varies the resistance value of the resistance pattern provided on the fixed substrate 482, and the resistance value is supplied from the electrode terminal 484 on the fixed substrate 482 as the rotational position of the revolving output shaft, or as the deflection angle detected signal of the swivel reflector 31.

The revolving output shaft 44 is adapted to be connected with the rotary disc 483 of the potentiometer 48 via a clutch, and comprises a hollow shaft 441 covered on the fixed shaft 481 of the potentiometer 48 so as to be capable of torsional rotation, a clutch cylinder 442 in the shape of a short cylinder integrally provided at the lower end portion of the hollow shaft 441, and a sector gear 443 formed integrally along a part of the outer periphery of the clutch cylinder 442. The clutch cylinder 442 is disposed so as to cover the rotary disc 483 and provided at a part of the circumference thereof with a notch 444. A clutch spring 445 formed by bending the spring wire material into a substantially circular shape and being resiliently attached on the peripheral surface of the rotary disc is engaged with the notch 444 at both ends, whereby the clutch cylinder 442 is connected to the rotary disc 483 via the clutch spring 445 so as to be frictional in the direction of rotation. Therefore, by rotating the revolving output shaft 44, or the clutch cylinder 442, by manual operation in a state in which rotation of the rotary disc 483 is locked by holding the adjusting strip 486 projected from a part of the circumference of the rotary disc 483 with a jig or the like, relative position between the potentiometer 48 and the revolving output shaft 44 in the direction of rotation can be adjusted by rotating the revolving output shaft 44 in a sliding motion with respect to the rotary disc 483 by the frictional connection of the clutch spring 445. The relative position adjustment is utilized for zero adjustment of the output from the potentiometer 48.

The speed reducing gear mechanism 46 is provide in the region between the brushless motor 45 and the sector gear 443 of the potentiometer 48. The speed reducing gear mechanism 46 comprises a drive gear 461 mounted on the revolving shaft 453 of the brushless motor 45 and a first gear 464 and a second gear 465 rotatably supported respectively on two fixed shafts 462, 463 passing through the printed board 42 and standing upright at a required interval in the boss holes 416, 417 of the lower half 41D. The first gear 464 and the second gear 465 comprises integrally formed larger gears 464L, 465L and smaller gears 464S, 465S respectively. The drive gear 461 engages the larger gear 464L of the first gear 464, and the smaller gear 464S of the first gear 464 engages the larger gear 465L of the second gear 465, and then the smaller gear 465S of the second gear 465 engages the sector gear 443. Accordingly, a rotational force of the brushless motor 45 is reduced by the speed reducing gear mechanism 46 and transmitted to the sector gear 443, so that the revolving output shaft 44 is rotated at a reduced speed. The upper end portion of the revolving output shaft 44 is formed as a spline shaft 446 and passed through the output shaft hole 418 formed on the upper half 41U and projected from the upper surface of the case 41, so as to be fitted in the spline groove on the bearing portion 35 provided on the lower surface of the swivel reflector 31 to allow the swivel reflector 31 to rotate integrally by a rotational force of the revolving output shaft 44.

The movable contact point mechanism 49 disposed on the upper surface of the upper half 41U comprises a pair of contact point brushes 491 contained in the case 41, partially exposed part of them through a pair of rectangular holes 419 formed on the upper surface on a circumference and urged into the projecting direction by the springs 492, and a contact plate 493 having a spline shaft hole 494 for fitting the spline shaft 446 of the revolving output shaft 44 therein so as to be rotated integrally with the revolving output shaft 44 in the direction of rotation in the region above the contact point brushes 491. The contact point plate 493 is provided on the lower surface thereof with a pair of contact point strips (not shown) extending therefrom for sliding contact with the contact point brushes 491, so as to be capable of rotating together with the revolving output shaft 44 in a state in which the electrical contact with the contact point brushes 491 is maintained. The contact point plate 493 is provided with an electrode terminal 495 continuing to the contact point strip, and the electrode terminal 495 may be attached and detached with a connector, not shown, of the cable 36 connected to the halogen lamp 33 of the swivel lamp 30 shown in FIG. 2. The pair of contact point brushes 491 are connected to the ends of a pair of narrow conductive plates 496 extending respectively in the case 41 via the conductive wires 497, which in turn is electrically connected to the vehicle mounted power source, not shown, by a connector, not shown, to be connected to the other ends of the conductive plates 495. Accordingly, the movable contact point mechanism 49 electrically connects the halogen lamp 33 with the vehicle-mounted power source, and prevents the cable 36 for connecting the swivel lamp 30 and the actuator 4 from becoming kinked when the swivel reflector 31 of the swivel lamp 30 is moved, thereby ensuring smooth rotational movement of the swivel reflector 31.

Figure 7:
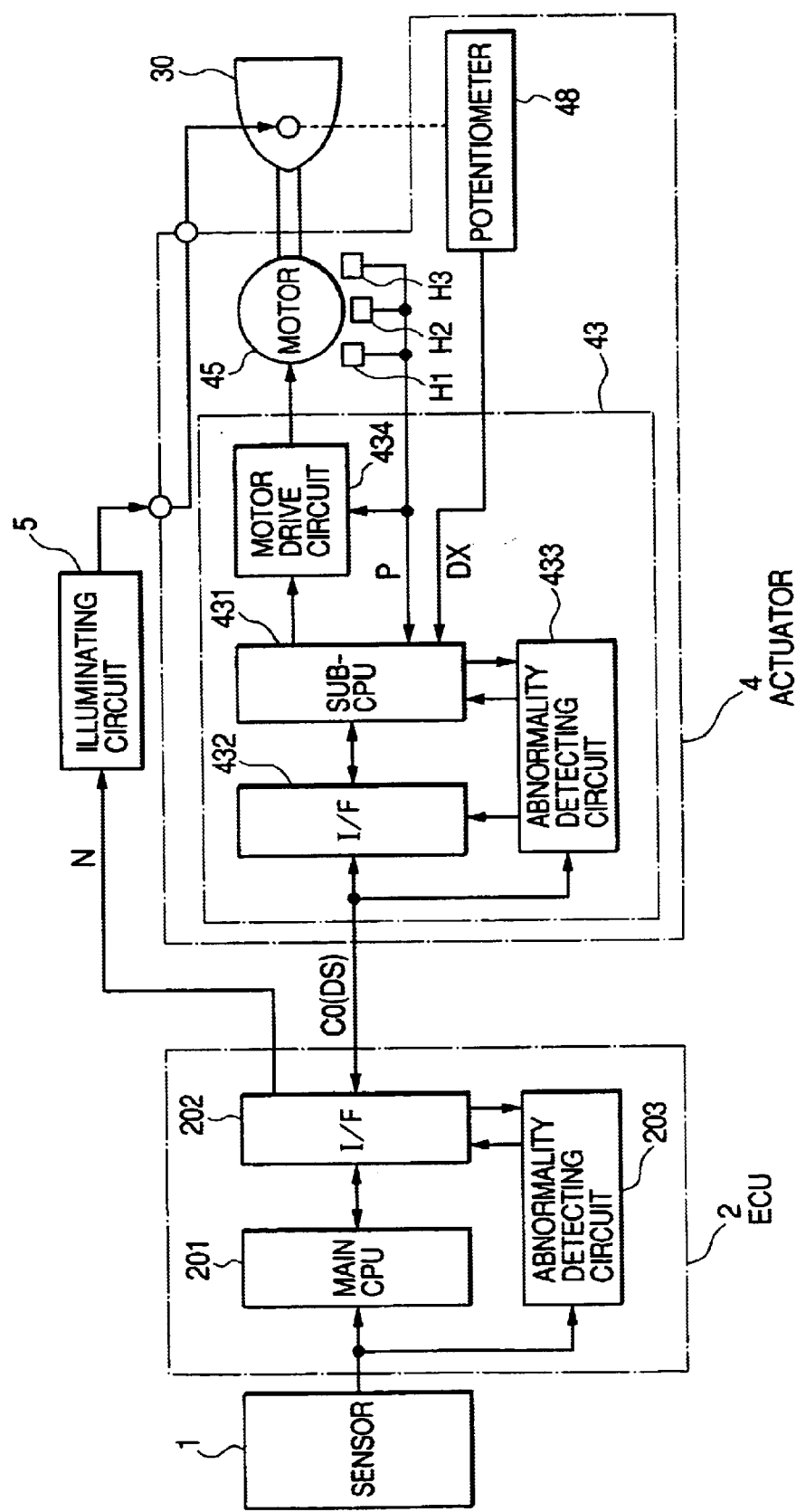
FIG. 7 is a block circuit diagram showing a circuit construction of the AFS.

FIG. 7 is a block circuit diagram showing the construction of the electric circuit of the ECU 2 and the actuator 4. The actuator 4 is mounted on the left and right swivel lamps 3L, 3R of the motor vehicle respectively, and being able to intercommunicate with the EUC 2. The ECU 2 contains a main CPU 201 for processing by a prescribed algorithm based on information from the aforementioned sensor 1 to output the required control signal CO, an interface circuit 202 for feeding and receiving the control signal CO between the main CPU 201 and the actuator 4 (hereinafter referred to as I/F), an abnormality detecting circuit 203 for observing the various signals in the ECU 2 including the main CPU 201 and supplying the abnormality-detected signal when abnormality is detected. The function of the abnormality detecting circuit 203 may be performed by the main CPU 201.

The controlling circuit 43 comprising electronic components contained in the actuators 4 provided respectively in the swivel lamps 30 provided in the left and right swivel type lights 3L, 3R of the motor vehicle comprises an I/F circuit 432 for feeding and receiving the signal to and from the ECU 2, a sub-CPU 431 for processing by a prescribed algorithm based on the signal entered form the I/F circuit 432, pulse signal P fed from the hall elements H1, H2, H3, and the deflection angle detected signal DX entered from the potentiometer 48, an abnormality detecting circuit 433 for observing signals supplied through the I/F circuit 432 and supplying an abnormality-detected signal to the sub-CPU 431 when such signals are determined to be abnormal, and a motor drive circuit 434 for driving and rotating the brushless motor 45. It is also possible to make the sub-CPU 431 function as the abnormality detecting circuit 433. The deflection angle signal DS of the swivel lamp 30 is supplied from the ECU 2 as a part of the aforementioned control signal, and entered into the actuator 4. A lights-out signal N for turning the swivel lamp 30 off when a disorder occurred is supplied from the ECU 2, and the lights-out signal is adapted to be entered into the illuminating circuit 5 provided separately from the actuator 4 for turning the swivel lamp 30 on.

Figure 8:
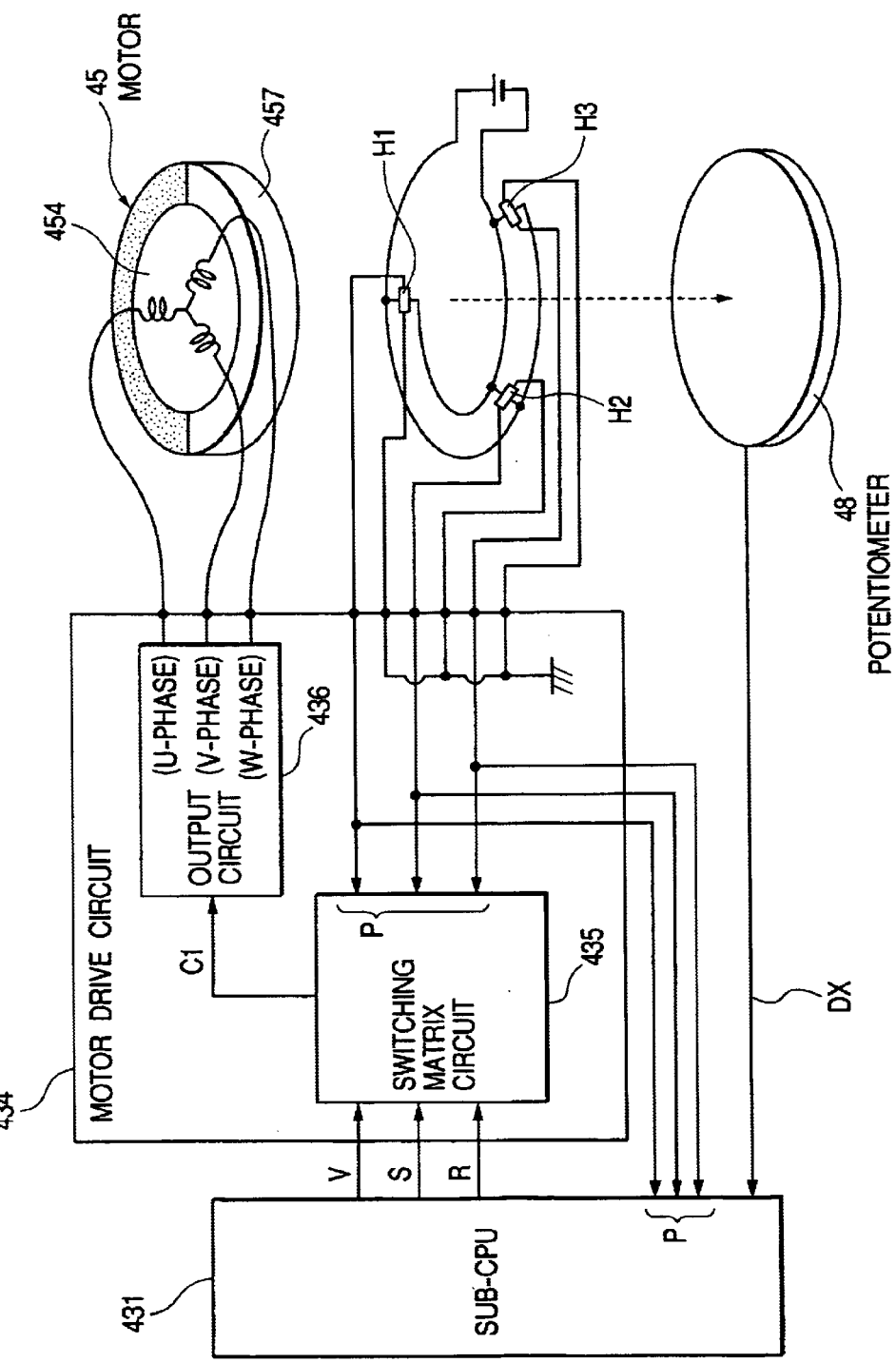
FIG. 8 is a circuit diagram showing a circuit construction of the actuator.

FIG. 8 is a circuit diagram showing a frame format of the motor drive circuit 434 and the brushless motor of the actuator 4. A switching matrix circuit 435 for receiving speed control signal V, start/stop signal S, normal/reverse rotation signal R respectively from the sub-CPU of the actuator 4 as control signal, and pulse signal from the three hall elements H1, H2, H3, and an output circuit 436 for adjusting the phase of electric power in three phases (U phase, V phase, and W phase) to be supplied to three pairs of coils in the stator coil 454 of the brushless motor 45 upon receipt of the output from the switching matrix circuit 435.

In this motor drive circuit 434, supplying each electric power of U phase, V phase, and W phase to the stator coil 454 rotates the magnet rotor 457, and thus the rotor 455 and the revolving shaft 453 integrated therewith rotate. When the magnet rotor 457 rotates, each hall element H1, H2, H3 detects variations in magnetic field, and then supplies pulse signal P. The pulse signal P is entered into the switching matrix circuit 435, and the switching operation in the output circuit 436 is performed in exact timing with the pulse signal supplied into the switching matrix circuit 435, so that the rotation of the magnet rotor 457 continues. The switching matrix circuit 435 supplies a required control signal C1 to the output circuit 436 base on speed control signal V, start/stop signal S, and normal/reverse rotation signal R from the sub-CPU 431. The output circuit 436, upon receipt of the control signal C1, adjusts the phase of electric power in three phases to be supplied to the stator coil 454 to control the start and stop of the rotational motion, the direction of rotation, and speed of rotation of the brushless motor 45. The output from the potentiometer 48 provided in the actuator 4 is entered into the sub-CPU 431. The sub-CPU 431 receives a part of the pulse signal P supplied from each hall element H1, H2, H3, and recognizes the rotating state of the brushless motor 45.

According to the construction described above, as shown in FIG. 1, when information on the steering angle of the steering wheel SW of the motor vehicle, the speed of the motor vehicle, and other traveling state of the motor vehicle is supplied from the sensor 1 disposed in the motor vehicle into the ECU 2, the ECU 2 performs calculation in the main CPU 201 based on the supplied sensor outputs, calculates the deflection angle signal of the swivel lamp 30 of the swivel type lights 3L, 3R in the motor vehicle, and enters it into the respective actuators 4 of the swivel type lights 3L, 3R. Then, in the actuator 4, the sub-CPU 431 performs calculation based on the supplied deflection angle signal, calculates the signal corresponding to the deflection angle signal and supplies to the motor drive circuit 434, and drives and rotates the brushless motor 45. Since the rotational drive force of the brushless motor 45 is decelerated in the speed reducing gear mechanism 46 and transmitted to the revolving output shaft 44, the swivel reflector 31 connected to the revolving output shaft 44 rotates in the horizontal direction, and the direction of the optical axis of the swivel lamp 30 is varied. When the swivel reflector 31 makes a rotary motion, the rotary disc 483 of the potentiometer 48 is rotated with the rotation of the revolving output shaft 44, and thus the rotating angle of the revolving output shaft 44, or the deflecting angle of the swivel reflector 31 is detected based on variations in resistance value when the sliding contact point is slid on the surface of the resistance pattern on the fixed substrate 482 by a rotary motion of the rotary disc 483, and the deflection angle detected signal DX is entered into the sub-CPU 431. The sub-CPU 431 then compares the deflection angle detected signal DX with the deflection angle signal DS supplied form the ECU 2, and performs feedback control on the rotating angle of the brushless motor 45 to make them coincide with each other, so that the direction of the optical axis of the swivel reflector 31, or the direction of the optical axis of the swivel lamp 30 can be controlled to the angular position set by the deflection angle signal DS with high degree of accuracy.

With such deflecting motion of the swivel reflector 31, in both of the swivel type lights 3L, 3R, light directed in the straight ahead direction of the motor vehicle emitted from the fixed lamp 20 and deflected light emitted from the swivel lamp 30 are joined to illuminate the area including the left and right areas deflected from the straight ahead direction of the motor vehicle, so that not only the straight ahead direction of the motor vehicle, but also the front area in the steered directions can be illuminated during travel of the motor vehicle, thereby enabling enhancement of driving safety.

However, in such AFS, a failure based on the following failures may occur in the sensor 1, the ECU 2, the actuator 4.

A: sensor failure
  a1: vehicle speed sensor failure
  a2: steering sensor failure
  a3: other sensor failure
B: ECU failure
  b1: main CPU failure (power supply system, overdrive)
  b2: I/F circuit failure
C: actuator failure
  c1: sub-CPU failure (power supply system, overdrive)
  c2: brushless motor failure
  c3: potentiometer failure
  c4: mechanical (speed reducing mechanism, etc.) failure
  c5: I/F circuit failure
D: failure of signaling system
  d1: failure of signaling system from sensor to ECU
  d2: failure of signaling system from ECU to the actuator When such a failure occurred, the optical axis of the swivel lamp 30 becomes motionless in the deflected state, and thus the unfavorable state in terms of traffic safety, such that oncoming cars are dazzled as described above, may occur. When such a failure occurred, the ECU 2 and the actuator 4 communicates with each other in both directions and abnormality detected signal is supplied from the respective abnormality detecting circuits 203, 433 contained therein. When the failures A, D occurred, abnormality can be detected by the abnormality detecting circuit 203 of the ECU 2. When the abnormality is detected by the abnormality detecting circuit, the abnormality-detected signal is entered into the main CPU 201, and upon receipt of this signal, the main CPU 201 outputs the lights-out signal N and an angle signal to make the deflection angle of the swivel lamp 30 to zero (straight ahead direction) as deflection angle signal DS. The actuator 4 receives this angle signal, and the sub-CPU 431 controls the motor drive circuit 434 to control the swivel reflector 31 to be faced toward the straight ahead direction of the motor vehicle. At this time, it is also possible to turn the swivel lamp 30 off by the illuminating circuit 5 based on the lights-off signal N. As regards the failures B, D, abnormality can be detected by the abnormality detecting circuit 433 in the actuator 4, and when abnormality is detected in this circuit, the sub-CPU 431 controls the motor drive circuit 434 as is described before to control the swivel reflector 31 to be faced toward the straight ahead direction of the motor vehicle. It is needless to say that such control is performed by a feedback control utilizing the deflection angle detected signal DX in the potentiometer 48. Consequently, when the disorder in the AFS occurred, the optical axis of the swivel lamp 30 is forced to be faced toward the straight ahead direction of the motor vehicle, and thus the swivel lamp 30 is prevented from being motionless with the optical axis thereof deflected, whereby failsafe capability is exercised and thus traffic safety is ensured.

On the other hand, when the failure C occurred in the actuator 4, especially when c1, c3, c5 occurred, abnormality can be detected by the abnormality detecting circuit 203 of the ECU 2, but the motor drive circuit 434 does not function normally, and thus the aforementioned failsafe capability cannot be exercised. When the failures c2, c3, c4 occurred, abnormality can be detected by the abnormality detecting circuit 433 of the actuator 4, but the actuator 4 does not function normally even when the motor drive circuit 434 functions normally, and thus the aforementioned failsafe capability cannot be exercised. In the case of failures c1, c2, c4, c5 out of these failures, the swivel lamp 30 is fixed in the direction of the optical axis as it used to be when it was functioning normally upon occurrence of the failure, and thus it is referable that they are allowable in terms of traffic safety. However, in the case of c3, the erroneous swivel operation occurs based on the erroneously detected deflection angle from the potentiometer 48, and thus the optical axis of the swivel lamp 30 is moved to the direction independent of the direction of travel of the motor vehicle, which might cause unfavorable conditions in terms of traffic safety such as dazzling oncoming cars or the like. Accordingly, in the case of the failure c3, the reference position setting signal is supplied from the main CPU 201 or the sub-CPU 431 in the normal condition, and controls the motor drive circuit 434 to exercise a failsafe function that force the optical axis of the swivel lamp 30 to face toward the straight ahead direction of the motor vehicle or in the predetermined reference direction.

Figure 9:
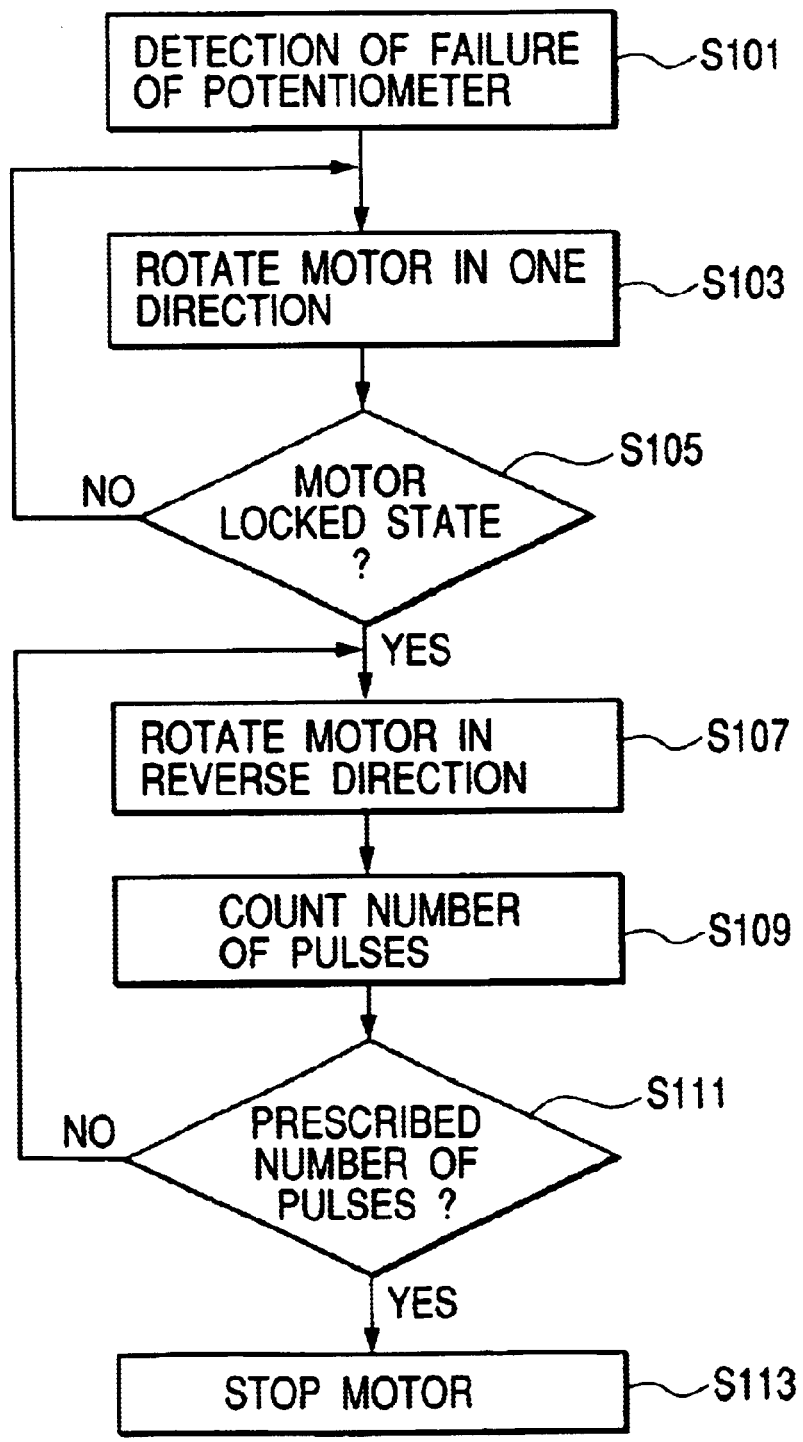
FIG. 9 is a flow chart showing the reference position setting operation when a disorder occurred.
Figure 10:
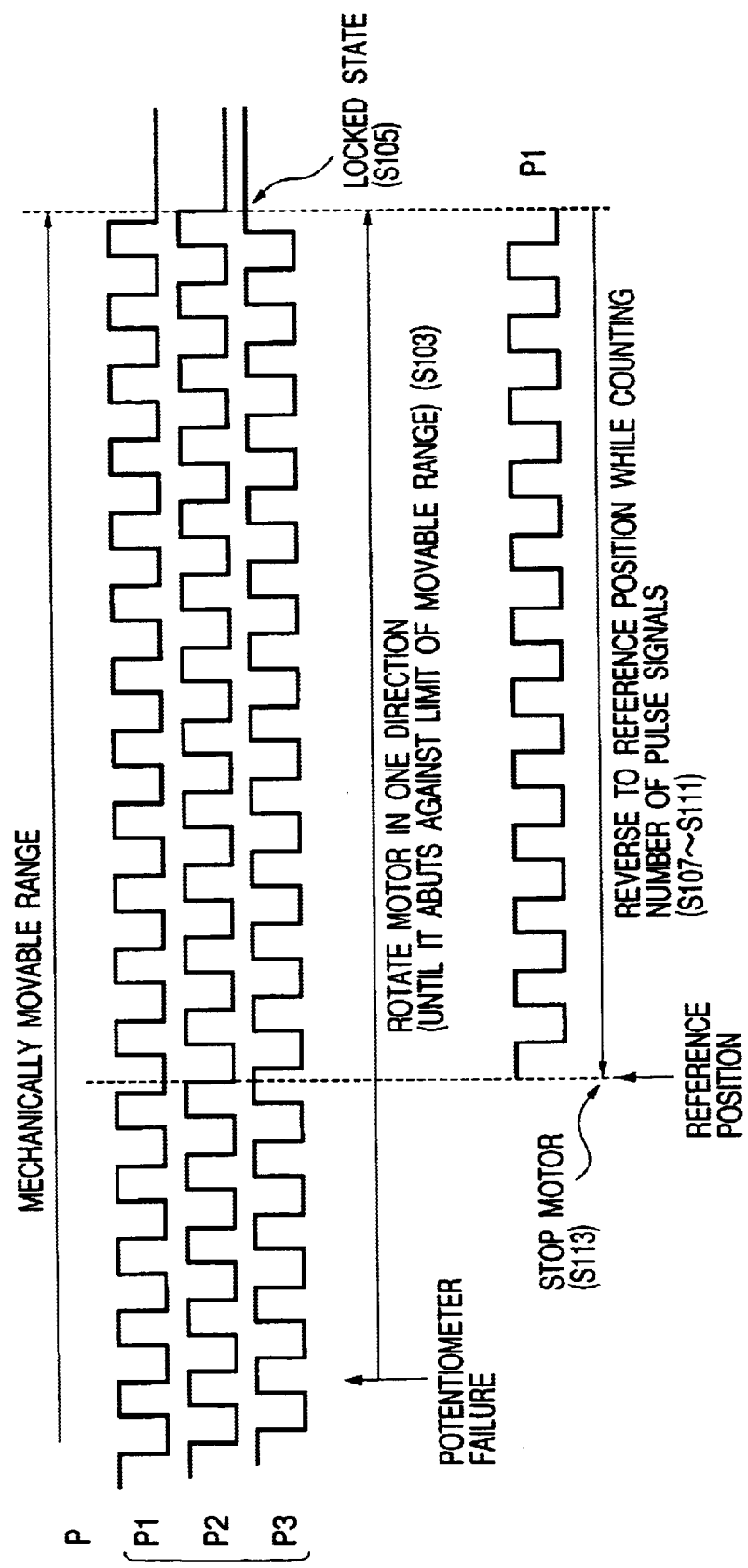
FIG. 10 is a signal waveform chart for illustrating the reference position setting operation when a disorder occurred.

The reference position setting operation will now be described. The reference angular position setting means here is constructed of a brushless motor 45, three hall elements H1, H2, H3, the sub-CPU 431, and a motor drive circuit 434 out of elements constructing the actuator 4. FIG. 9 is a flow chart illustrating the reference position setting operation, FIG. 10 is a waveform chart of the pulse signal P (P1, P2, P3) supplied from the three hall elements H1, H2, H3 provided on the brushless motor 45 three hall elements H1, H2, H3 provided on the brushless motor 45. When the failure c3 is detected in the abnormality detecting circuits 203, 433 (S101), the motor drive circuit 434 forces the brushless motor 45 to continuously rotate in one direction by the reference position setting signal from the sub-CPU 431 (S103). As is described above, since the rotational force of the revolving shaft 453 of the brushless motor 45 is transmitted to the revolving output shaft 44 via the speed reducing mechanism 46 to rotate the sector gear 443 integrated with the revolving output shaft 44, engagement between the portion of the sector gear 443 in the direction of rotation and the smaller gear 465S of the second gear 465 is brought into the locked state, and further rotation is blocked. When such locked state is effected, the brushless motor 45 is also brought into the locked state, and the pulse signals P (P1, P2, P3) from the hall elements H1, H2, H3 are fixed to a constant level, and thus the sub-CPU 431 recognizes that the blushless motor 45 is in the locked state (S105).

Subsequently, the sub-CPU 431 supplies the reverse rotation signal to the motor drive circuit 434 to start rotation of the brushless motor in the reverse direction (S107), and at the same time, the number of pulses of pulse signal P1 from at least one hall element out of the hall elements H1, H2, H3, in this case, from H1, is counted (S109). Rotation of the brushless motor stops (S113) at the moment when a prescribed number of pulses are counted (S111). Since the number of pulses is set to the number with which the optical axis of the swivel lamp 30 is faced toward the straight ahead direction of the motor vehicle, or the predetermined reference direction corresponding to the number of revolution of the brushless motor 45, the optical axis of the swivel lamp 30 is fixed in the state facing toward the predetermined reference direction by the reference position setting operation, and thus even when the potentiometer 48 is broken down, the optical axis of the swivel lamp 30 can be fixed in the prescribed direction, thereby enabling to exercise failsafe capability which is favorable in terms of traffic safety. In addition, in this case, setting to the reference angular position can be made without the ECU along the path, which is advantageously efficient.

Counting of the number of pulses may be performed on the pulse signal from any one of hall element. Alternatively, counting may be performed on all the pulse signals. Further, the locking state of the motor can also be recognized by increasing the motor current. When the cycle of the pulse signal is constant, that is, when the revolving speed of the brushless motor is constant, the time of reverse rotation from the locked state may be counted and set in the reference direction. This method is effective when it is applied to the brushless motor that has no hall element.

Though an example of the AFS using the headlamp comprising the fixed lamp and the swivel lamp integrated with each other is shown as a swivel type light in the aforementioned embodiment, such construction that the swivel lamp, being formed as a single independent light, is used as an auxiliary lamp and combined with the headlamp comprising a fixed lamp to construct a swivel type light is also employed.

As is described above, since the present invention is provided with reference angular position setting means for setting the deflection angle of the lamp to the predetermined reference angular position when the deflection angle of the lamp cannot be detected in the AFS and thus the system lapsed into malfunction, the condition in which the lamp is fixed into the abnormal deflection angle with respect to the traveling direction of the vehicle can be prevented before happens, and thus failsafe that is favorable in terms of traffic safety may be realized. As reference angular position setting means, such a construction that the motor is rotated in one direction to the locked state, and from this locked state, the motor that is rotated by a given amount is rotated by the given amount in the reverse direction may be employed, and by utilizing pulse signal supplied from the hall element attached on the motor to rotate the motor in the reverse direction by a prescribed amount, additional components other than the existing motor is not necessary, thereby preventing increase in complexity of construction and in the cost.

What is claimed is:

1. A vehicle lighting apparatus comprising:

lamp deflection angle controlling means for controlling changes in a deflection angle of a direction of radiation of a lamp corresponding to traveling conditions of a vehicle; and deflection angle detecting means for detecting the deflection angle of said lamp, wherein said lamp deflection angle controlling means includes:

abnormality detecting means for detecting abnormality of said deflection angle detecting means; and reference angular position setting means for setting the deflection angle of said lamp to a predetermined reference angular position when abnormality occurs in said deflection angle detecting means, wherein said reference angular position setting means comprises:

a motor for changing the deflection angle of said lamp;

rotational position detecting means for detecting a rotational position of said motor; and motor controlling means for driving and controlling said motor,
wherein said motor controlling means controls said motor to rotate in one direction to a locked state when abnormality occurs in said deflection angle detecting means, and said motor controlling means controls said motor to rotate in a reverse direction by a prescribed rotational angle after said motor is brought into the locked state.

2. The vehicle lighting apparatus according to claim 1, wherein said motor includes a hall element for supplying a pulse signal in accordance with a rotational operation of said motor, and
wherein said motor controlling means counts the number of pulses of the pulse signal supplied from said hall element in order to rotate said motor in the reverse direction by the prescribed rotational angle.

3. The vehicle lighting apparatus according to claim 1, wherein said lamp deflection angle controlling means comprises:
   a sensor for detecting a steering direction of the vehicle;
   a control unit for supplying a lamp defection angle signal based on an output of said sensor; and
   an actuator for deflecting said lamp based on the lamp deflection angle signal,
wherein said abnormality detecting means are provided in said control unit and said actuator respectively, so that said reference angular position setting means is actuated without said control unit along a path when abnormality is detected by said abnormality detecting means in said actuator.

4. The vehicle lighting apparatus according to claim 2, wherein said lamp deflection angle controlling means comprises:
   a sensor for detecting a steering direction of the vehicle;
   a control unit for supplying a lamp defection angle signal based on an output of said sensor; and
   an actuator for deflecting said lamp based on the lamp deflection angle signal,
wherein said abnormality detecting means are provided in said control unit and said actuator respectively, so that said reference angular position setting means is actuated without said control unit along a path when abnormality is detected by said abnormality detecting means in said actuator.

5. A vehicle lighting apparatus comprising:
lamp deflection angle controlling means for controlling changes in a deflection angle of a direction of radiation of a lamp corresponding to traveling conditions of a vehicle; and
deflection angle detecting means for detecting the deflection angle of said lamp,
wherein said lamp deflection angle controlling means includes:
   abnormality detecting means for detecting abnormality of said deflection angle detecting means; and
   reference angular position setting means for setting the deflection angle of said lamp to a predetermined reference angular position when abnormality occurs in said deflection angle detecting means,
wherein said lamp deflection angle controlling means comprises:
   a sensor for detecting a steering direction of the vehicle;
   a control unit for supplying a lamp defection angle signal based on an output of said sensor; and
   an actuator for deflecting said lamp based on the lamp deflection angle signal, and
wherein said abnormality detecting means are provided in said control unit and said actuator respectively, so that said reference angular position setting means is actuated without said control unit along a path when abnormality is detected by said abnormality detecting means in said actuator.

6. A vehicle lighting apparatus comprising:
lamp deflection angle controlling means for controlling changes in a deflection angle of a direction of radiation of a lamp corresponding to traveling conditions of a vehicle; and
deflection angle detecting means for detecting the deflection angle of said lamp,
wherein said lamp deflection angle controlling means includes:
   abnormality detecting means for detecting abnormality of said deflection angle detecting means; and
   reference angular position setting means for setting the deflection angle of said lamp to a predetermined reference angular position when abnormality occurs in said deflection angle detecting means,
wherein said lamp deflection angle controlling means comprises:
   a sensor for detecting a steering direction of the vehicle;
   a control unit for supplying a lamp defection angle signal based on an output of said sensor; and
   an actuator for deflecting said lamp based on the lamp deflection angle signal, and
wherein said abnormality detecting means are provided in said control unit and said actuator respectively, and said abnormality detecting means in said actuator detects abnormality of said control unit.

7. A vehicle lighting apparatus comprising:
lamp deflection angle controlling means for controlling changes in a deflection angle of a direction of radiation of a lamp corresponding to traveling conditions of a vehicle; and
deflection angle detecting means for detecting the deflection angle of said lamp,
wherein said lamp deflection angle controlling means includes:
   abnormality detecting means for detecting abnormality of said deflection angle detecting means; and
   reference angular position setting means for setting the deflection angle of said lamp to a predetermined reference angular position when abnormality occurs in said deflection angle detecting means,
wherein said lamp deflection angle controlling means comprises:
   a sensor for detecting a steering direction of the vehicle;
   a control unit for supplying a lamp defection angle signal based on an output of said sensor; and
   an actuator for deflecting said lamp based on the lamp deflection angle signal, and
wherein said abnormality detecting means are provided in said control unit and said actuator respectively, and said abnormality detecting means in said control unit detects abnormality of said actuator.

8. A vehicle lighting apparatus comprising:

lamp deflection angle controlling means for controlling changes in a deflection angle of a direction of radiation of a lamp corresponding to traveling conditions of a vehicle; and deflection angle detecting means for detecting the deflection angle of said lamp, wherein said lamp deflection angle controlling means includes:

abnormality detecting means for detecting abnormality of said deflection angle detecting means; and reference angular position setting means for setting the deflection angle of said lamp to a predetermined reference angular position when abnormality occurs in said deflection angle detecting means, wherein said lamp deflection angle controlling means comprises:

a sensor for detecting a steering direction of the vehicle;

a control unit for supplying a defection angle signal based on an output of said sensor;

an actuator for deflecting said lamp based on the lamp deflection angle signal; and a potentiometer for detecting the deflection angle of said lamp, and wherein the deflection angle of said lamp is set to the predetermined reference angular position based on a signal from at least one of a CPU in said control unit and a CPU in said actuator when said abnormality detecting means detects abnormality in said potentiometer.

\* \* \* \* \*